Oct. 28, 1969   A. G. STIMSON ET AL   3,475,616
AUTOMATIC COLOR FILTER CONTROL
Filed Sept. 15, 1966   2 Sheets-Sheet 1

ALLEN G. STIMSON
DAVID L. BABCOCK
INVENTORS

BY
ATTORNEYS

Oct. 28, 1969  A. G. STIMSON ET AL  3,475,616
AUTOMATIC COLOR FILTER CONTROL

Filed Sept. 15, 1966  2 Sheets-Sheet 2

ALLEN G. STIMSON
DAVID L. BABCOCK
INVENTORS

BY

Robert W Hampton

ATTORNEYS

United States Patent Office 3,475,616
Patented Oct. 28, 1969

3,475,616
AUTOMATIC COLOR FILTER CONTROL
Allen G. Stimson and David L. Babcock, Rochester, N.Y., assignors to Eastman Kodak Company, Rochester, N.Y., a corporation of New Jersey
Filed Sept. 15, 1966, Ser. No. 579,743
Int. Cl. G01j 1/44; G03b 7/08
U.S. Cl. 250—226                                            5 Claims

ABSTRACT OF THE DISCLOSURE

An automatic filter control for a camera automatically inserts a color correcting filter in response to a change in composition of the scene illuminant.

---

This invention relates to automatic color filter controls for use with photosensitive substances, particularly color film.

As is well known, color film which is sensitized to be balanced for indoor tungsten illumination must be used with a color compensating filter if it is to be used outdoors in sunlight. Of course, the reverse is also true. In prior art cameras, if a particular color film was being used indoors, the filtering would have to be changed in order to use the same film outdoors. In such prior art arrangements, assuming that for the proper ambient illumination conditions the operator forgot to change the filter, outdoor pictures would be too blue, or indoor pictures would be too yellow.

It is therefore an object of this invention to solve some of the above problems of prior art cameras by providing automatic means whereby the camera's filter will automatically be changed in response to ambient illumination.

These and other objects and advantages of the invention are accomplished by providing at least two photoelectric cells, each being responsive to a different color of light. The ratio of the currents passed by the two photoelectric cells is compared. When the ratio is above a predetermined value, a color filter will be inserted between the subject and the film. When the ratio is below this value, the filter will be removed. These operations are accomplished automatically so that the operator need not concern himself with whether he has selected the correct filter. This is especially useful with a film such as Kodachrome II, type A, which has the same film speed indoors, or outdoors with a type 85 filter.

The invention will be better understood by reference to the drawings wherein.

Figure 1:
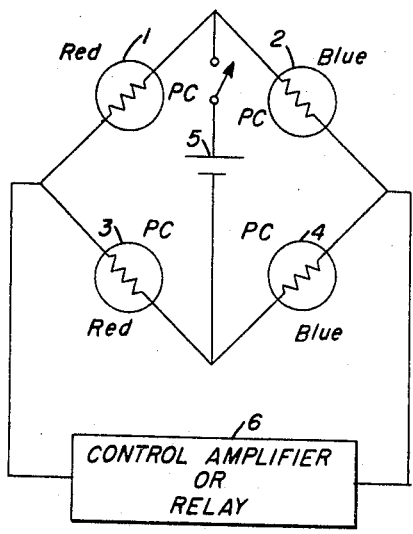
FIG. 1 is a schematic diagram of an embodiment of the invention using a bridge arrangement.

Referring to the drawings in which corresponding parts have been identified by the same number, there is shown in FIGURE 1, a bridge consisting of four photoconductive cells. Each cell is sensitive to light of a particular wavelength. Cells 1 and 3 are sensitive to red light and cells 2 and 4 are sensitive to blue light. Connected from the junction of cells 1 and 2 to the junction of cells 3 and 4 is battery 5. Connected from the junction of cells 1 and 3 to the junction of cells 2 and 4 is control amplifier or relay 6.

In operation, when the cells are illuminated by a higher percentage of blue than red, as would be the case when used outdoors, the control amplifier or relay is triggered so as to insert an outdoor type filter (not shown) between the subject and the photosensitive film in any well known manner. When the light falling on the photocells is predominantly red, as is the case when photographs are being taken indoors, the direction of the current is such so that the control amplifier or relay 6 is triggered to effect movement of an indoor type filter (not shown) between the subject and the photosensitive medium in any well known manner. In this way the camera automatically adjusts its own filtering in accordance with whether the illumination is sunlight (outdoors) or comes from tungsten bulbs as would be used indoors.

Figure 2:
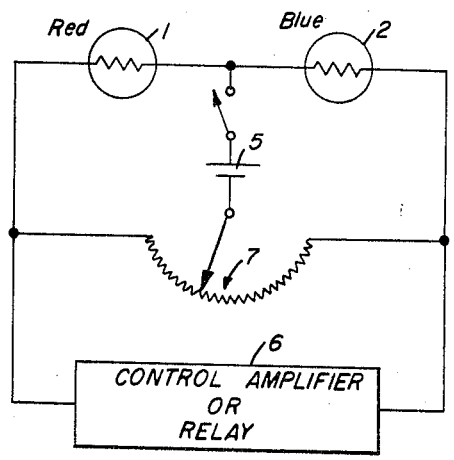
FIG. 2 is a schematic diagram of an embodiment using two photocells and a single control.

FIGURE 2 shows a system according to the present invention which uses two photoconductive cells, a red-sensitive cell 1 and a blue-sensitive cell 2. The two cells are connected together; battery 5 is connected to this junction by a suitable switching arrangement. The remaining leads of cells 1 and 2 are each connected to the respective ends of potentiometer 7 whose center lead is connected to the negative terminal of battery 5. Control amplifier or relay 6 is also connected to the ends of potentiometer 7. In this embodiment potentiometer 7 regulates the point at which the filter in the camera will be changed. It should be noted also that in this embodiment only two photoconductive cells are used, and that the point at which the filter is changed is easily varied.

Figure 3:
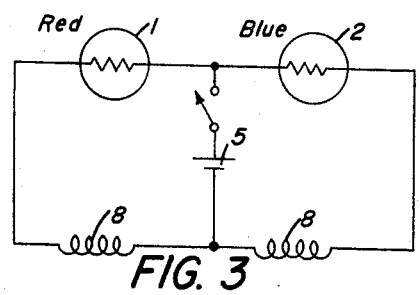
FIG. 3 is a schematic diagram of an embodiment using two photocells and a dual coil control.

FIGURE 3 shows an embodiment similar to FIG. 2 but wherein a dual coil actuator is substituted for a potentiometer. The two coils of the actuator have been designated by the reference number 8. The filtering is changed when the force of one coil overcomes the force of the other coil sufficiently to change the filter.

Figure 4:
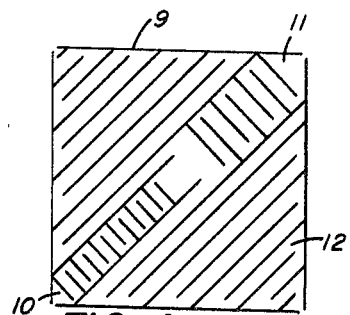
FIG. 4 is a schematic diagram on a one-piece cell which has a bridge circuit interdigitation.

FIGURE 4 shows a photoconductive cell bridge composed of four photoconductors all on the same surface. These four photoconductors have been labeled 9, 10, 11 and 12, in FIGURES 4 and 5. Each of the individual cells is an interdigital array of conductors sandwiching a photoconductive material between the conductors and a non-conductive substrate, one conductor of each array being common with a conductor of another cell. Note that the internal connections between the individual cells are made directly on the surface of the bridge. This enables the four cells to be made in one compact package.

Figure 6:
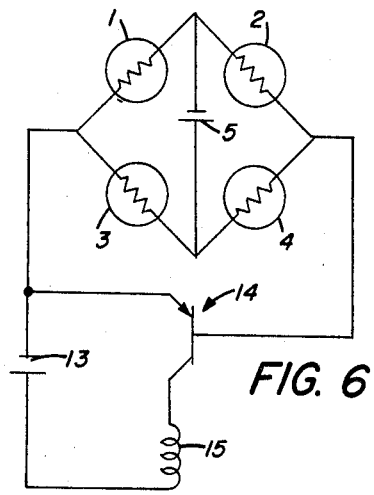
FIG. 6 is a schematic diagram of an embodiment using a PNP transistor amplifier to drive a relay.
Figure 5:
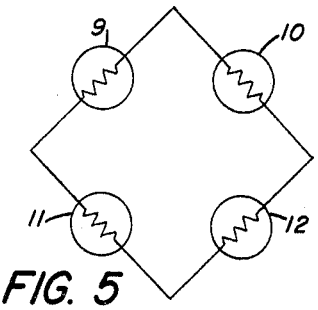
FIG. 5 is a circuit diagram of the one-piece photocell of FIG. 4.
Figure 7:
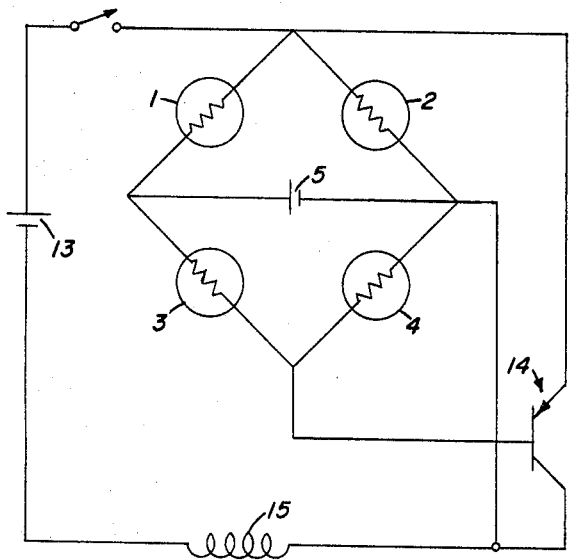
FIG. 7 is a schematic diagram of a further embodiment using a PNP transistor amplifier to drive a relay.

FIGURES 6 and 7 show bridge circuits which could be in the form shown in FIGURES 4 and 5, used with transistor amplifier 14 using a PNP transistor. Power for the transistor is furnished by battery 13 to relay coil 15 which actuates the filter (not shown) in any well known manner.

Figure 8:
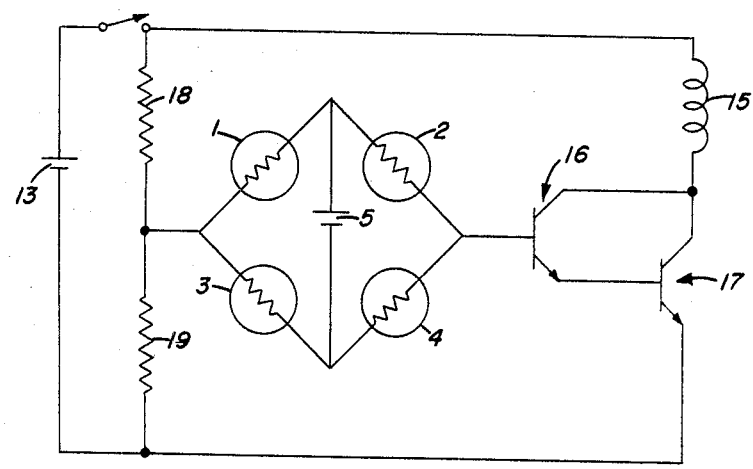
FIG. 8 is a schematic diagram of an embodiment using a pair of NPN transistors to drive a relay.

FIGURE 8 shows a bridge circuit using photoconductive cells which may be of the type shown in FIGURES 4 and 5 but which incorporates a transistor amplifier consisting of NPN transistors 16 and 17. As in the embodiments disclosed in FIGURES 6 and 7, the current for the transistor amplifier is supplied by battery 13 to power relay coil 15.

The invention has been described in detail with particular reference to preferred embodiments thereof, but it will be understood that additional variations and modifications can be effected within the spirit and scope of the invention as described hereinabove and as defined in the appended claims.

We claim:
1. In a camera for exposing a photosensitive medium to photograph a subject, an apparatus for positioning a filter in only two predetermined discrete positions, one of said positions being in the path between said subject and said photosensitive medium, and another of said positions being out of said path, and a plurality of means each responsive to a different range of light frequencies for automatically positioning said filter in response to the color of the illumination of said subject.

2. An apparatus as in claim 1 in which said means for automatically positioning the filter includes a plurality of photocells, at least one photocell being sensitive to radiation of a particular range of frequencies, and at least one other photocell being sensitive to a different range of frequencies.

3. An apparatus as in claim 1 in which said means for automatically positioning the filter includes four bridge connected photocells, each of said photocells being responsive to a particular range of frequencies, said bridge being connected to means for changing the position of the filter, so that when the light composition reaches a predetermined value, the filter will be changed.

4. An apparatus as in claim 1 in which said means for positioning the filter includes a bridge comprising four photocells, one junction of said bridge being connected to the base of a transistor, and the opposite junction of said bridge being connected to the emitter of said transistor, the collector of said transistor being connected to said means for changing the position of the filter.

5. An apparatus as in claim 1 in which said means for positioning the filter includes a bridge comprising four photocells, one junction of said bridge being connected to the base electrode of a transistor, the opposite junction of said bridge being connected to the emitter electrode of said transistor and to a battery, and the collector electrode of said transistor being connected to said bridge and to said means for changing the position of the filter.

References Cited

UNITED STATES PATENTS

| 3,241,441 | 3/1966 | Barbour et al. | 356—175 X |
| 3,013,232 | 12/1961 | Lubin | 338—17 |
| 3,225,208 | 12/1965 | Wolfe | 250—210 |
| 2,923,828 | 2/1960 | Bernath | 250—211 |
| 3,202,827 | 8/1965 | Robinson | 250—211 XR |
| 3,246,586 | 4/1966 | Hunt | 95—12.2 XR |
| 3,314,349 | 4/1967 | Koeber | 352—45 XR |
| 3,351,762 | 11/1967 | Adkins | 250—226 |

FOREIGN PATENTS 1,058,024  11/1953  France.

WALTER STOLWEIN, Primary Examiner

U.S. Cl. X.R.

95—12.2; 250—210